United States Patent

Poisson et al.

(10) Patent No.: US 10,355,917 B2
(45) Date of Patent: Jul. 16, 2019

(54) METHOD AND APPARATUS FOR COMMUNICATION BETWEEN MASTER AND SLAVE PROCESSORS

(71) Applicant: Hamilton Sundstrand Corporation, Charlotte, NC (US)

(72) Inventors: Richard A. Poisson, Avon, CT (US); Michael Abbott, Shelburne, VT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/472,896

(22) Filed: Mar. 29, 2017

(65) Prior Publication Data
US 2018/0287861 A1    Oct. 4, 2018

(51) Int. Cl.
| | | |
|---|---|---|
| H04L 12/24 | (2006.01) |
| G06F 13/42 | (2006.01) |
| G06F 11/00 | (2006.01) |
| G06F 11/14 | (2006.01) |
| G06F 11/16 | (2006.01) |
| H04L 12/403 | (2006.01) |
| H04L 12/40 | (2006.01) |

(52) U.S. Cl.
CPC ........ *H04L 41/0668* (2013.01); *G06F 11/004* (2013.01); *G06F 11/14* (2013.01); *G06F 11/1625* (2013.01); *G06F 13/42* (2013.01); *H04L 12/403* (2013.01); *H04L 2012/40273* (2013.01)

(58) Field of Classification Search
CPC ............... H04L 41/0668; H04L 12/403; H04L 2012/40273
See application file for complete search history.

(56) References Cited

U.S. PATENT DOCUMENTS

| | | | |
|---|---|---|---|
| 5,604,918 A | 2/1997 | Huijsing | |
| 6,956,339 B1 | 10/2005 | Kureck et al. | |
| 7,567,862 B2 | 7/2009 | Pelton et al. | |
| 9,916,213 B1* | 3/2018 | Bruce | G06F 11/2007 |
| 2004/0198366 A1* | 10/2004 | Crocker | H04W 76/19 455/452.1 |
| 2007/0101030 A1 | 5/2007 | Fischer | |
| 2007/0217442 A1* | 9/2007 | McLoughlin | B01F 15/0416 370/442 |
| 2010/0222955 A1* | 9/2010 | Chevalier | B60R 16/0231 701/31.4 |
| 2015/0026374 A1* | 1/2015 | Decesaris | G06F 13/40 710/110 |

OTHER PUBLICATIONS

HART communication Foundation, "HART, Field Communications Protocol, Application Guide," Jan. 1, 1999.

* cited by examiner

*Primary Examiner* — Feben Haile
(74) *Attorney, Agent, or Firm* — Carlson, Gaskey & Olds, P.C.

(57) ABSTRACT

An example system includes a slave processor and a master processor. The master processor is configured to communicate with the slave processor over a digital communication link in a first mode, and over an analog communication link in a second mode. A method is also disclosed.

10 Claims, 3 Drawing Sheets

200

METHOD AND APPARATUS FOR COMMUNICATION BETWEEN MASTER AND SLAVE PROCESSORS

BACKGROUND

The present disclosure relates to communication between master and slave devices over a communication bus.

A communication bus provides a physical connection between two or more components, such as a master device and one or more slave devices. Communications between the master and slave devices can fail for a variety of reasons, such as electromagnetic interference (EMI) which can effect a certain frequency band. For example, if the master device uses a given frequency range to transmit communications to a slave device over a communication bus, and the EMI effects that range, then the communications may be compromised.

SUMMARY

An example system includes a slave processor and a master processor. The master processor is configured to communicate with the slave processor over a digital communication link in a first mode, and over an analog communication link in a second mode. A method is also disclosed.

The embodiments described herein may be taken independently or in any combination. Features described in connection with one embodiment are applicable to all embodiments, unless such features are incompatible.

DETAILED DESCRIPTION

Figure 1:
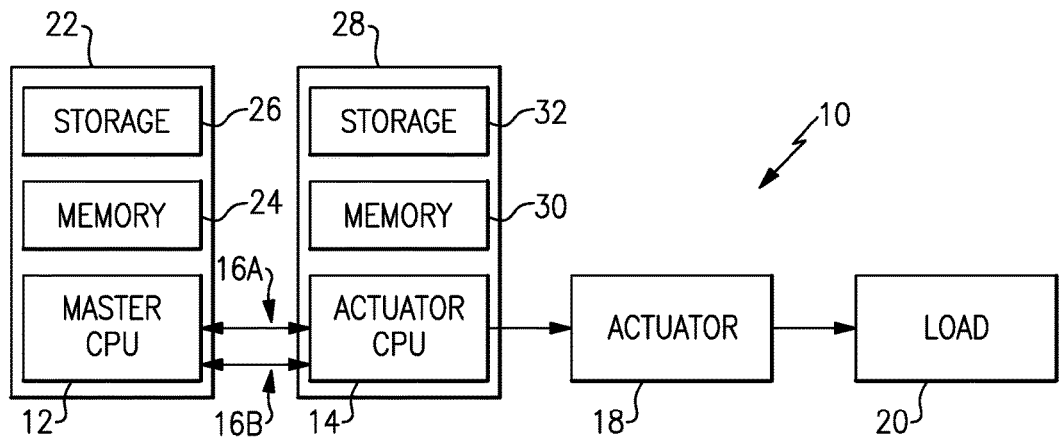
FIG. 1 schematically illustrates an example actuator control system for a machine.

FIG. 1 schematically illustrates an example actuator control system 10 for a machine, such as a vehicle (e.g., an aircraft). In the system 10, a master central processing unit (CPU) 12 communicates with an actuator CPU 14 over a digital communication link 16A in a first mode, and over an analog communication link 16B in a second mode. The analog communication link 16B provides redundancy in case the master CPU 12 and actuator CPU 14 are unable to communicate properly over the digital communication link 16A.

The actuator CPU 14 controls an actuator 18 which controls a load 20. The load 20 may include a vehicle braking, steering, or acceleration system, for example. The master CPU 12 and actuator CPU 14 are part of respective computing devices 22, 28 that include respective memory 24, 30 and respective storage 26, 32 (e.g., a hard drive or other electronic, optical, magnetic, or other storage).

Figure 2:
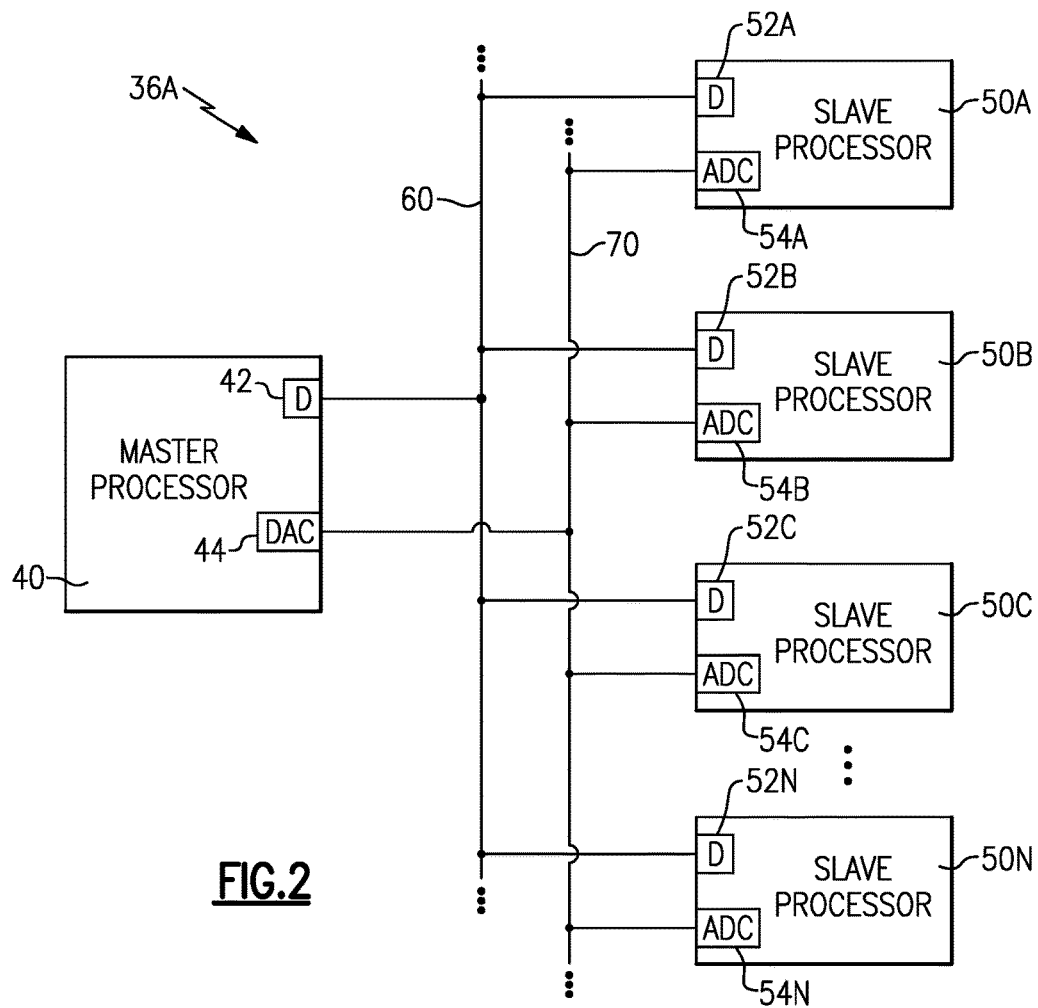
FIG. 2 schematically illustrates an example communication configuration that may be used in the control system of FIG. 1.

Although only a single actuator CPU 14 is shown in FIG. 2, it is understood that the same master CPU 12 could control a plurality of actuator CPUs 14, each of which in turn control a respective actuator 18 and respective load 20.

FIG. 2 schematically illustrates an example communication configuration 36A that may be used in the system 10 of FIG. 1 or in other systems.

Figure 3:
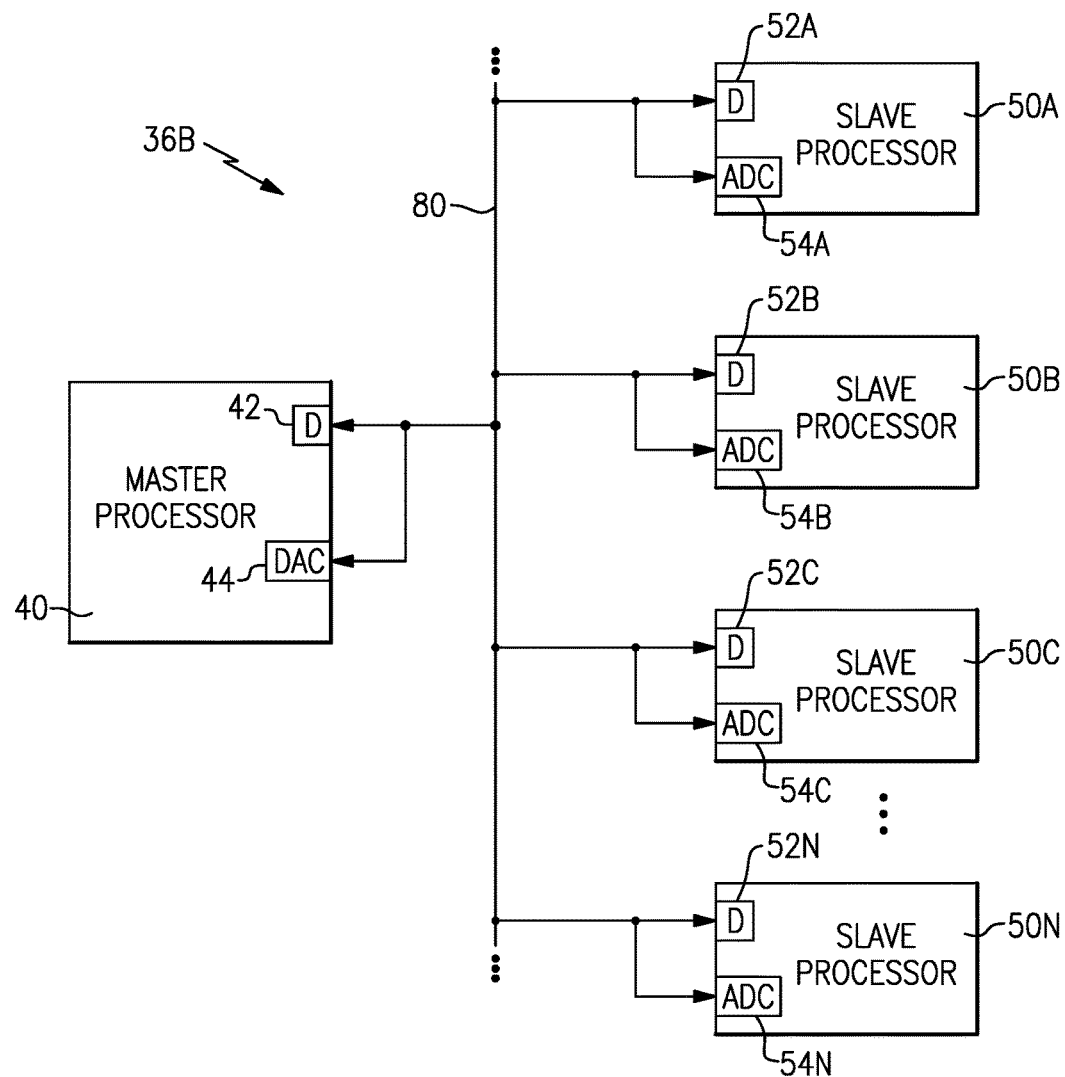
FIG. 3 schematically illustrates another example communication configuration that may be used in the control system of FIG. 1.

FIG. 3 schematically illustrates another example communication configuration 36B that may be used in the system 10 of FIG. 1 or in other systems.

Figure 4:
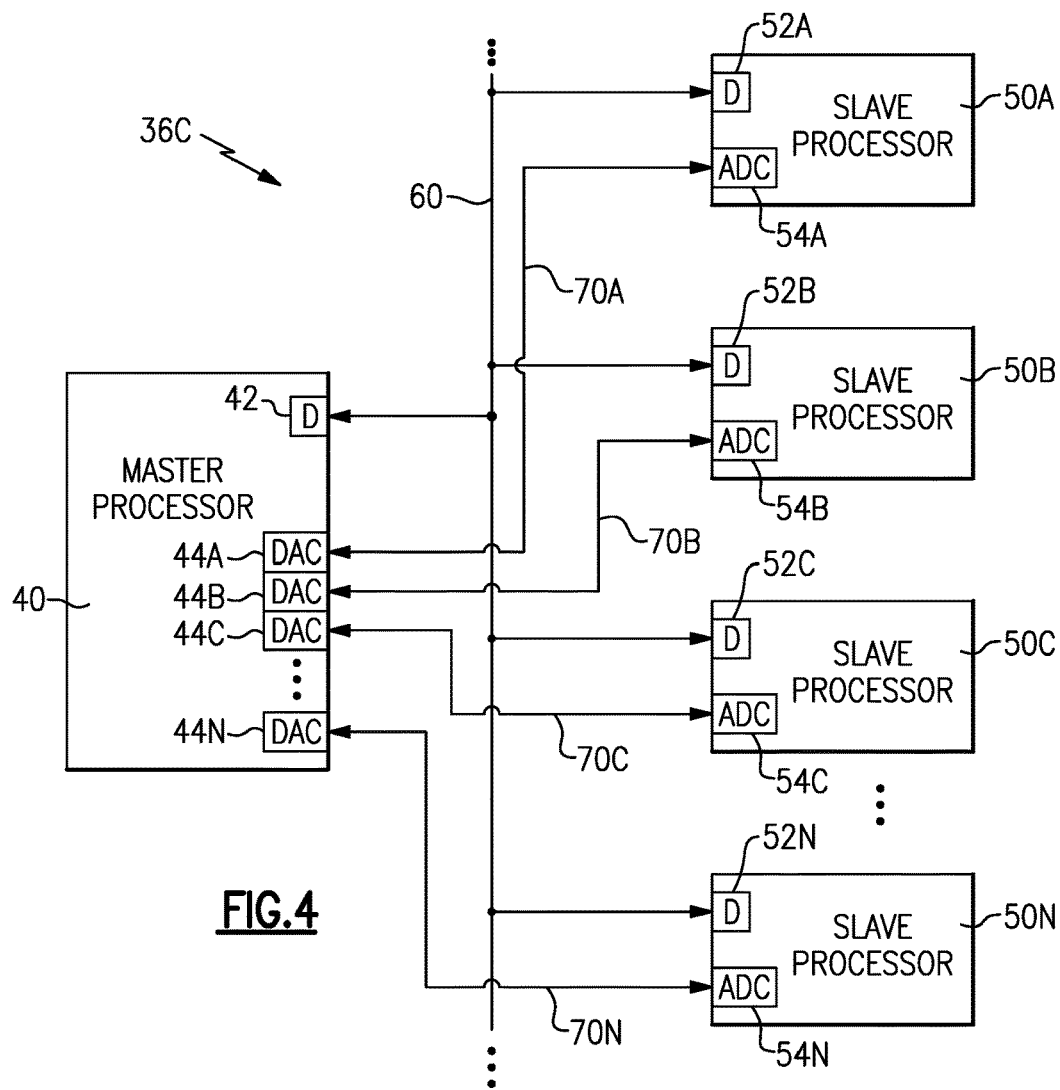
FIG. 4 schematically illustrates another example communication configuration that may be used in the control system of FIG. 1.
Figure 5:
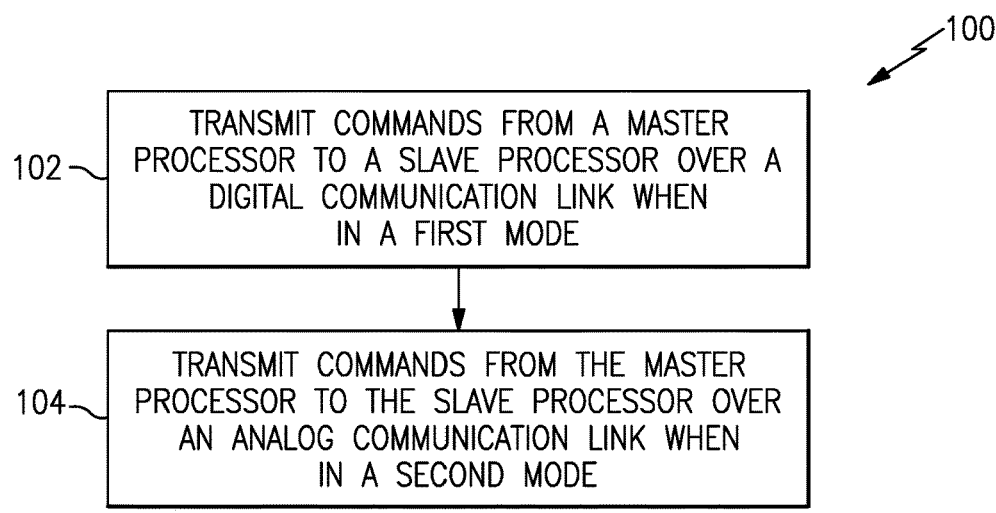
FIG. 5 schematically illustrates a flowchart of an example method of controlling a slave device.

FIG. 4 schematically illustrates another example communication configuration 36C that may be used in the system 10 of FIG. 1 or in other systems.

In each of the configurations 36A-C, a master processor 40 is shown which may be used as the master CPU 12, and a plurality of slave processors 50A-N are shown which may be used as respective ones of the actuator CPUs 14. For simplicity, the memory 24, 30 and storage 26, 32 are not shown in FIGS. 2-4.

In each of the configurations 36A-C, the master processor 40 is configured to communicate with the slave processors 50A-D over a digital communication link 16A in a first mode, and over an analog communication link 16B in a second mode. In the example of FIG. 2, a digital bus 60 is used for the digital communication link 16A, and a separate analog bus 70 is used for the analog communication link 16B. In the example of FIG. 3, a shared bus 80 is used for both the digital and analog communication links 16A-B. In the example of FIG. 4, digital bus 60 is used for the digital communication link 16A, and a plurality of respective analog busses 70A-N are used for the analog communication link 16B. Each analog bus 70A-N in FIG. 4 connects a respective one of the slave processors 50A-N to the master processor 40.

In one example of configuration 36A and/or 36C, the master processor 40 operates in the first and second modes simultaneously by default. Thus, if the master processor 40 has a command to send to the slave processors 50A-N, it sends the command to the slave processors 50A-N over both the digital bus 60 and the analog bus 70.

In one example of configuration 36A and/or 36B and/or 36C, the master processor 40 operates in the first mode by default, and in response to a detected fault on the digital communication link initiates operation in the second mode while continuing to operate in the first mode. This mode could be useful, for example, if a fault condition only affects communication with some, but not all, of the slave processors 50, and there is a desire for some of the slave processors 50 to continue communicating with the master processor 40 on the digital communication link during the fault.

In one example of configuration 36C, for example, the master processor 40 only initiates operation on some of the analog busses 70A-N. Assume, for example, that the master processor 40 becomes unable to communicate with slave processor 50A on the digital bus 60 but can still communicate with slave processors 50B-N on the digital bus 60. In such an example, the master processor could enter the second mode to communicate with slave processor 50A over its respective analog bus 70A while continuing to communicate with the slave processors 50B-N on the digital bus 60.

In another example of configuration 36A and/or 36B and/or 36C, the master processor 40 operates in the first mode by default, and in response to a detected fault on the digital communication link initiates operation in the second mode and ceases operation in the first mode. In this example, the plurality of slave processors 50 are prevented from using the digital communication link to communicate with the master processor 40 during the fault.

An example fault on the digital communication link could include a threshold amount of EMI being detected on the digital communication link. In one example, the EMI may only affect a certain frequency band used by the digital communication link 16A, while the analog communication link 16B uses a different frequency band that is not affected by the EMI.

Other example fault conditions could include a failure of a slave processor 50 to properly send an acknowledgement back to the master processor 40 that a command was successfully received, and/or the master processor 40 detecting that an actuator 18 controlled by a given slave processor 50 did not perform an intended action. These conditions could be caused by the digital bus 60 being severed or shorted, for example. These are only non-limiting fault conditions, however, and other fault conditions could be used to trigger the second mode in some examples.

Each slave processor 50 receives a given command over the digital communication link 16A, the analog communication link 16B, or both. In some examples, the master processor 40 may send a single command to be performed by every slave processor 50. In other examples, the master processor 40 may send a command addressed to one or more, but not all, of the slave processors 50. For example, assume that the master processor 40 transmits a command that instructs only slave processor 50A to perform an action. The slave processors 50B-N are in some examples configured to receive that command and ignore it.

The master processor 40 and slave processors 50 include respective digital interfaces 42, 52 that are used for communication over the digital communication link. The master processor 40 also a digital-to-analog converter (DAC) 44 which serves as an analog interface by converting a digital signal of the master processor 40 to an analog format for transmission over the analog communication link. Each slave processor includes an analog-to-digital converter (ADC) 54 which serves as an analog interface by converting that analog signal back to a digital form. In the example of configuration 36C, the master processor 40 includes a different DAC 44A-N for each respective analog bus 70A-N.

The "resolution" of an ADC refers to a number of bits that the ADC converts an analog signal into, and the resolution of a DAC similarly refers to a number of bits that the DAC converts an analog signal into. In one example, the DAC 44 and ADC 54 have the same resolution. In other examples, the DAC 44 has a first resolution, and the ADCs 54A-N have a different, second resolution (e.g., one that is lower than the first resolution). In one such example, the slave processors 50 are configured to map commands received over the analog communication link and identified at the first resolution to predefined commands stored in memory of the slave processor 50 and identified at the second resolution.

FIG. 4 schematically illustrates a method 100 of controlling a slave processor 50. A master processor 40 transmits commands to the slave processor 50 over a digital communication link when in a first mode (step 102). The master processor 40 transmits commands to the slave processor 50 over an analog communication link when in a second mode (step 104).

As discussed in the examples above, the master processor 40 may operate in the first and second modes simultaneously by default; may operate in the first mode by default and in response to a detected fault on the digital communication link initiate operation in the second mode while continuing to operate in the first mode; or may operate in the first mode by default and in response to a detected fault on the digital communication link initiate operation in the second mode and cease operation in the first mode.

The communication configurations 36A-C discussed above could be useful for systems in which electronic actuation is taking the place of traditional mechanical actuation, such as so-called "drive-by-wire", "steer-by-wire", and "brake-by-wire" systems. For example, vehicle throttles have historically used a throttle cable, but drive-by-wire systems replace that cable with a throttle pedal position sensor that detects a position of an accelerator pedal and electronically transmits that position to a throttle actuator. Steer-by-wire and brake-by-wire systems similarly replace mechanical actuation with electronic actuation. The configurations 36A-C could be useful for such applications, as reliability of electronic communications may become increasingly important when replacing a traditional mechanical actuation system.

Some conventional systems handle a communication breakdown on a digital communication link by so-called "failsafing" in which a controlled device automatically performs a set of behaviors believed to minimize harm to equipment and/or people. The configurations 36A-C discussed above in some examples provide an alternative to failsafing if a digital communication link fails, because the analog communication link provides a robust alternative to the digital communication link.

Although the examples above have been discussed in conjunction with actuators and vehicles, these are only non-limiting example applications, and it is understood that the method 100, processors 40, 50, and busses 60, 70, 80 could be used in non-actuator and/or non-vehicle applications.

Additionally, although FIGS. 2-4 show a single master processor 40 in communication with four slave processors 50, it is understood that these are non-limiting examples, and that any number of slave processors 50 could be used (e.g., 1-3 or 5+).

Although example embodiments have been disclosed, a worker of ordinary skill in this art would recognize that certain modifications would come within the scope of the claims. For that reason, the following claims should be studied to determine their true scope and content.

What is claimed is:

1. A system, comprising:
  a plurality of slave processors; and
  a master processor configured to communicate with the plurality of slave processors over a digital communication link when operating in a first mode, and over an analog communication link when operating in a second mode, and change between said first and second modes based on detection of a fault condition on the digital communication link;
  wherein the master processor operates in the first mode for the plurality of slave processors by default, and in response to the fault condition on the digital communication link for a given one of the slave processors, initiates operation in the second mode for at least the given one of the slave processors and ceases operation in the first mode for at least the given one of the slave processors; and
  wherein the digital communication link comprises a first communication bus connected to the master processor and each of the slave processors, and the analog communication link comprises a plurality of different, second communication busses that each connect a respective one of the slave processors to the master processor.

2. The system of claim 1, wherein in response to the fault condition on the digital communication link for the given one of the slave processors, the master processor initiates operation in the second mode for the given one of the plurality of slave processors while continuing to operate in the first mode for others of the plurality of slave processors that are different than the given one of the plurality of slave processors, thereby enabling the others of the plurality of slave processors to continue communicating with the master processor on the digital communication link during the fault condition.

3. The system of claim 1, wherein in response to the fault condition on the digital communication link for the given one of the slave processors, the master processor initiates operation in the second mode for each of the plurality of slave processors and ceases operation in the first mode for each of the plurality of slave processors, thereby preventing the plurality of slave processors from using the digital communication link to communicate with the master processor during the fault condition.

4. A system, comprising:
a slave processor; and
a master processor configured to communicate with the slave processor over a digital communication link in a first mode, and over an analog communication link in a second mode, and change between said first and second modes based on detection of a fault condition;
wherein the analog communication link comprises a communication bus that connects a digital-to-analog converter (DAC) of the master processor to an analog-to-digital converter (ADC) of the slave processor, the DAC having a first resolution, and the ADC having a second resolution that is different from the first resolution; and
wherein the slave processor is configured to map commands received by the ADC and identified at the first resolution to predefined commands stored in memory and identified at the second resolution.

5. The system of claim 1, comprising an actuator, wherein the slave processor is configured to control the actuator based on commands received from the master processor over either of the digital communication link and the analog communication link.

6. The system of claim 5, wherein the actuator controls braking, acceleration, or steering of a vehicle.

7. A method of communicating between a master processor and a plurality of slave processors, comprising:
transmitting commands from a master processor to a plurality of slave processors over a digital communication link in a first mode, wherein transmitting commands over the digital communication link comprises transmitting commands over a first communication bus connected to the master processor and each of the slave processors;
transmitting commands from the master processor to the plurality of slave processors over an analog communication link in a second mode, wherein transmitting commands over the analog communication link comprises transmitting commands over a plurality of different, second communication busses that each connect a respective one of the slave processors to the master processor;
operating the master processor in the first mode by default; and
changing between said first and second modes based on detection of a fault condition on the digital communication link, wherein said changing comprises in response to the fault condition on the digital communication link for a given one of the slave processors, initiating operation in the second mode for at least the given one of the slave processors and ceasing operation in the first mode for at least the given one of the slave processors.

8. The method of claim 7, wherein in response to identifying the fault condition on the digital communication link for the given one of the slave processors, the master processor initiates operation in the second mode for the given one of the plurality of slave processors while continuing to operate in the first mode for others of the plurality of slave processors that are different than the given one of the plurality of slave processors, thereby enabling the others of the plurality of slave processors to continue communicating with the master processor on the digital communication link during the fault condition.

9. The method of claim 7, wherein in response to identifying the fault condition on the digital communication link for the given one of the slave processors, the master processor initiates operation in the second mode for each of the slave processors and ceases operation in the first mode for each of the slave processors, thereby preventing the plurality of slave processors from using the digital communication link to communicate with the master processor during the fault condition.

10. The method of claim 7:
wherein transmitting commands over the analog communication link comprises converting digital command identifiers to an analog format using a digital-to-analog converter (DAC) having a first resolution;
the method comprising:
receiving the analog command identifiers at the slave processor over the analog communication link;
converting the analog command identifiers back to a digital format using an analog-to-digital converter (ADC) having a second resolution that is different from the first resolution; and
mapping the digital commands at the second resolution to predefined commands stored in memory and identified at the first resolution;
the receiving, converting, and mapping being performed by the slave processor.

* * * * *